Feb. 3, 1925.

R. B. GOLDSCHMIDT ET AL

DIRECT READING RADIOTELEGRAPHIC COMPASS

Filed May 24, 1920

1,525,177

Patented Feb. 3, 1925.

1,525,177

UNITED STATES PATENT OFFICE.

ROBERT B. GOLDSCHMIDT AND RAYMOND BRAILLARD, OF PARIS, FRANCE.

DIRECT-READING RADIOTELEGRAPHIC COMPASS.

Application filed May 24, 1920. Serial No. 383,919.

*To all whom it may concern:*

Be it known the we, ROBERT BENEDICT GOLDSCHMIDT, a subject of the King of Belgium, residing at 350 Rue Saint Honore, Paris, France, and RAYMOND BRAILLARD, a citizen of the French Republic, residing at 101 Avenue Mozart, Paris, France, have invented new and useful Improved Direct-Reading Radiotelegraphic Compasses, for which we have filed an application in Belgium, May 21, 1919, and for which Patent No. 516,295, June 3, 1920, has been granted in France.

The methods at present employed in radio-goniometry for the determination of the azimuth of a radio-telegraphic sending station, consist in the estimation by hearing of the maxima and the minima in the intensity of the signals received, when the position of the receiving system or one of its parts is varied.

For this purpose, either a frame carrying a certain number of turns of wire and which can be rotated about a vertical axis, is employed, or a pair of antennæ or of fixed frames, situated in two vertical planes perpendicular to each other and coupled inductively or electrically to a third circuit including a movable coil or a movable condenser plate.

In the two cases, the current produced in the frames or the antennæ is sent to a detector and after rectification, into a telephone.

The operator manipulates by hand the movable frame or the movable coil or electrode of the third circuit and notes on a graduated scale the positions giving the maximum intensity or the two positions giving the extinction of the two sides of these maxima.

This operation is rather long and delicate and necessitates a relatively great amount of dexterity on the part of the operator.

It may be perceived besides that such a system, installed either on a ship, during bad weather, or on an aeroplane or dirigible, could not be used with all the rapidity and tranquility which would be necessary.

The device described below enables the measurement to be made instantaneously and automatically, and reduces the finding of the azimuth to a simple reading of a graduated circle.

In the accompanying drawings:—

Figure 1:
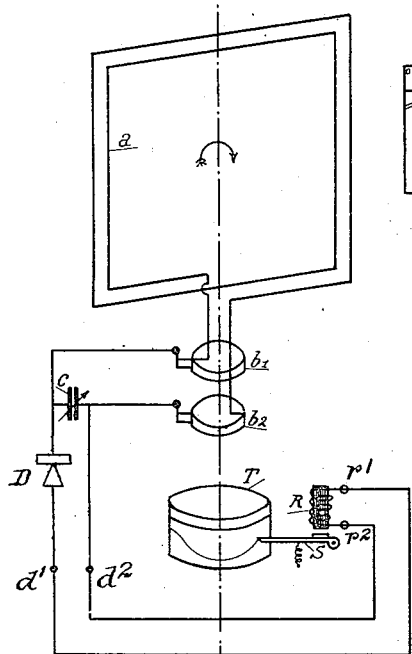
Fig. 1 is a diagrammatic perspective view of an apparatus constructed and arranged in accordance with this invention.

Consider (Fig. 1) a frame, movable about a vertical axis. The current is collected by two contacts bearing on the rings $b^1$, $b^2$, connected to the tuning condenser $c$. D is a detector of a suitable type, such as of the crystal type as shown in the drawing, by means of which the high frequency oscillations are rectified and act on the relay R. This detector may also be a magnetic detector, a thermionic valve with two electrodes or a thermionic valve with three electrodes of the audion type. The detector D furnishes at $d^1$, $d^2$ a rectified current whose amplitude is proportional to the intensity of the high frequency current generated in the frame and consequently to the cosine of the angle which forms the plane of the frame with the desired azimuth.

To $d^1$, $d^2$, is connected a relay R or a sensitive short period galvanometer, the moving part of which carries a light stylus S, the motions of which are proportional to the rectified current and in consequence to the cosine of the above angle.

Without changing the character of the invention it is possible to insert between $d^1$ and $d^2$ and between $r'$, $r^2$ a thermionic amplifier of well known type for the purpose of increasing the intensity of the rectified current flowing through the relay R.

This arm bears on a cylindrical drum T, keyed to the shaft of the frame and turning with the latter. The exterior surface of this drum is covered with a soft impressionable substance, lamp black, for example, and it bears a graduation in degrees of which the two zeros, at 180 degrees from each other, are placed in the plane of the frame.

Figure 2:
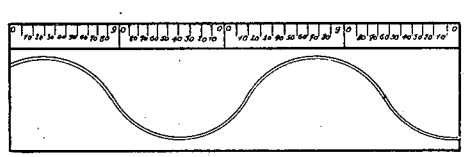
Fig. 2 is a detail elevation of the drum.

It is immediately understood that if the frame is rotated, the stylus S will trace on the drum T a sinusoidal curve having two maxima and two minima which will correspond to the two positions occupied by the frame in the plane perpendicular to the positions occupied in the plane perpendicular to the plane of the azimuth. The development of the curve traced is represented by Fig. 2.

If care is taken to note, by a comparison made in advance, the position of the point of the stylus S in relation to the meridian or to the azimuth of a known sending station, or else in relation to a known axis, one can easily determine the points where the inscribed curve has a maximum, and read on the graduated scale the azimuth of the unknown station in relation to a fixed known direction.

This fixed known direction, for example, may be the longitudinal axis of the ship or the aeroplane carrying the radio-goniometric frame.

Figure 3:
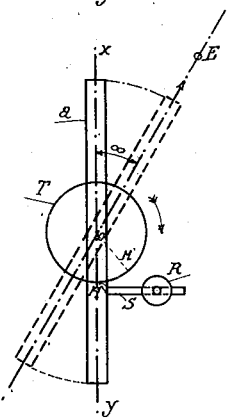
Fig. 3 is a diagrammatic plan of the apparatus.

Let $x$ $y$ represent this longitudinal axis (Fig. 3). When the frame, seen in plan on the figure, is in the plane passing through $x$ $y$, the point of the stylus bears on the drum T at the point M corresponding to the zero of the graduation.

Let E represent the sending station whose direction is to be determined, such that the direction O E makes an unknown angle $\alpha$ with the axis $x$ $y$.

When the frame is in the plane passing through $x$ $y$, the stylus S bears on the drum at a point M which is placed opposite the zero of the graduation.

The maximum amplitude of the stylus will be obtained when the frame is in the plane passing through O E and when the point M′, such that the angle M O M′, will be equal to $\alpha$, falls on the axis $x$ $y$.

It will be sufficient then to read on the graduation the value of the angle. (See Fig. 2.) The uncertainty of 180 degrees in the direction of the station E must be cleared by aid of the magnetic compass.

The speed of rotation of the frame may be chosen high enough so that the complete curve will be traced during the emission of one dash. The duration of a Morse dash being on the average one tenth of a second, it will be sufficient to rotate the frame at a rate of five or ten revolutions per second in order to obtain during the sending of a Morse dash, the trace of a single or a double sinusoid.

In order to make an observation, the frame would be pushed, either by hand or by a mechanical trip, so as to cause it to make several revolutions.

A system permitting the lifting of the stylus which would allow it to bear on the drum only during one revolution of the drum, can be easily arranged.

Figure 4:
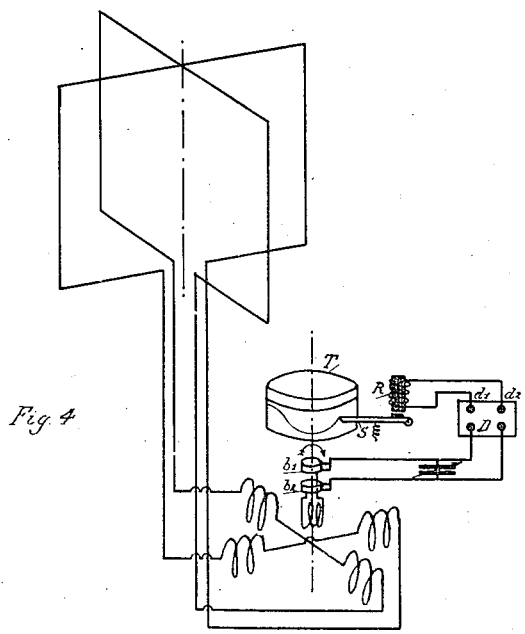
Fig. 4 is a diagrammatic perspective view of a modified form of the apparatus.

The device described above applies to a rotating frame In the case of two antennæ or frames, stationary and perpendicular to each other, the drum would be placed on the shaft of the coil or movable electrode of the third circuit, (Fig. 4), the position of the point of the stylus and the zeros of the graduation being suitably established.

This solution will be applicable more particularly to the installations made on board aeroplanes, dirigibles, or ships. The only moving part of the system will then include only the coil or movable electrode and the graduated drum mounted on the same shaft. This device is consequently very easy to handle and occupies little space.

After each observation taken, it will be necessary to paint the drum again with lamp black, which operation may be performed by the aid of a brush brought to bear on the surface of the drum by a tripping device and afterwards lifted so as to permit the inscription to be made.

The device described above necessitates, on the part of the operator, a very simple operation which may be avoided by the employment of the system which will be described below, and which consists in the replacement of the stylus S by a ray of light describing the sinusoidal curve on the drum T.

Figure 5:
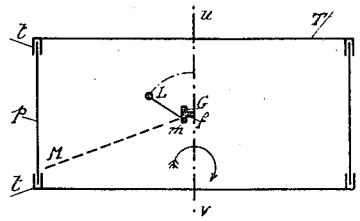
Fig. 5 is a detail vertical sectional view of the drum.
Figure 6:
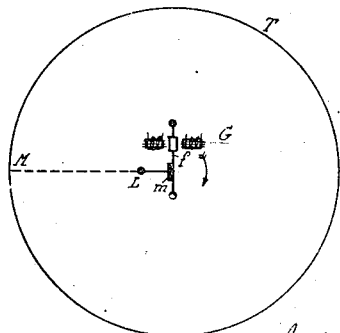
Fig. 6 is a detail horizontal sectional view of the same.

Consider (Fig. 5) a drum T consisting of a metallic frame $t$, $t$, supporting a cylindrical transparent wall $p$, of ground glass or mica, for example.

The drum T is stationary and carries a graduation in degrees, of which the origin is determined.

At the center of the drum is placed a torsion galvanometer G, mounted on a journal $u$ $v$ situated in the axis of the drum and turning either with the shaft of the coil or of the movable electrode of the third circuit, in the case of the use of the two perpendicular frames.

The wire $f$ of the galvanometer is perpendicular to the shaft $u$ $v$. It carries a small mirror $m$ parallel to the shaft $u$ $v$ and placed on this shaft.

The galvanometer is supplied with the rectified current coming from the detector. Its angle of torsion is therefore proportional to the cosine of the angle $\alpha$ which we have mentioned above.

Let L represent a luminous source reduced to a point and being in the plane passing through $u$ $v$ and perpendicular to the galvanometer wire. This source is stationary relatively to the galvanometer and will rotate, at the same rate as the latter, about the shaft $u$ $v$.

The ray of light coming from L is reflected by the mirror and forms at M a luminous spot on the drum, a spot which may be seen from the exterior of the drum on account of the transparence of the wall.

If the shaft $u$ $v$ is made to turn at the same rate as the receiving frame, or as the coil or movable electrode in the case of two stationary frames, the spot of light on the drum will be given on the one hand a circular motion, and on the other hand a vertical motion, its vertical elongation being proportional to the angle of torsion of the galvanometer.

The spot of light will therefore trace on the drum a luminous curve of sinusoidal shape, the two maxima of which will correspond to the positions of the movable frame in the plane of the required azimuth.

If the frame and the galvanometer turn at a rate of at least ten revolutions per second, the curve traced will appear permanent, as long as the waves are sent, by reason of the persistence of luminous impressions on the retina of the eye.

It will be sufficient to compare the position of the maxima of the curve traced with the origin of the graduations in order to read instantly, without any further manipulation, the azimuth of the sending station, in relation to the fixed known direction.

If the waves transmitted by the sending station are in the form of Morse signals instead of a continuous line, the curve will appear discontinuous, at least unless the rate of rotation be high enough to give it a continuous aspect. In any case, it will be easy to determine the position of the maxima.

The above apparatus can be combined with a magnetic compass so as to note the azimuth of the station being looked for in relation to the meridian, for example.

In order to accomplish this, the graduation of the drum T will be made movable, so that the zero of this graduation may be brought opposite to the position of the magnetic needle, the latter having its pivot coinciding with the axis of the radio-telegraphic compass.

The direction of the sending station E in relation to the meridian would thus be obtained, no matter what the position of the direction of the ship or the aeroplane might be.

What we claim is:

1. In radio-goniometric apparatus, a rotatable loop antenna, a current rectifier, an element responsive to variations of the rectified current and including a scribing element and an element to receive inscriptions, one of said elements being revoluble with the antenna.

2. In combination with a radio-goniometric receiver system, comprising a rotatable loop antenna electrically closed by a capacity, a detector being connected with the terminals of said tower, a system for recording directly the direction of a radio-telegraphic emitting station comprising an element actuated by the current furnished by the said antenna after application with such element acting on a pencil which inscribes on a cylindrical actuated drum, keyed on the axis of the said antenna and movable with the same, the curve of the current rectified as a function of the position of the said antenna.

In testimony whereof we affix our signatures.

ROBERT B. GOLDSCHMIDT.
RAYMOND BRAILLARD.